(No Model.)
S. C. SHEPARD.
DEVICE FOR CONVERTING MOTION.
No. 351,534. Patented Oct. 26, 1886.
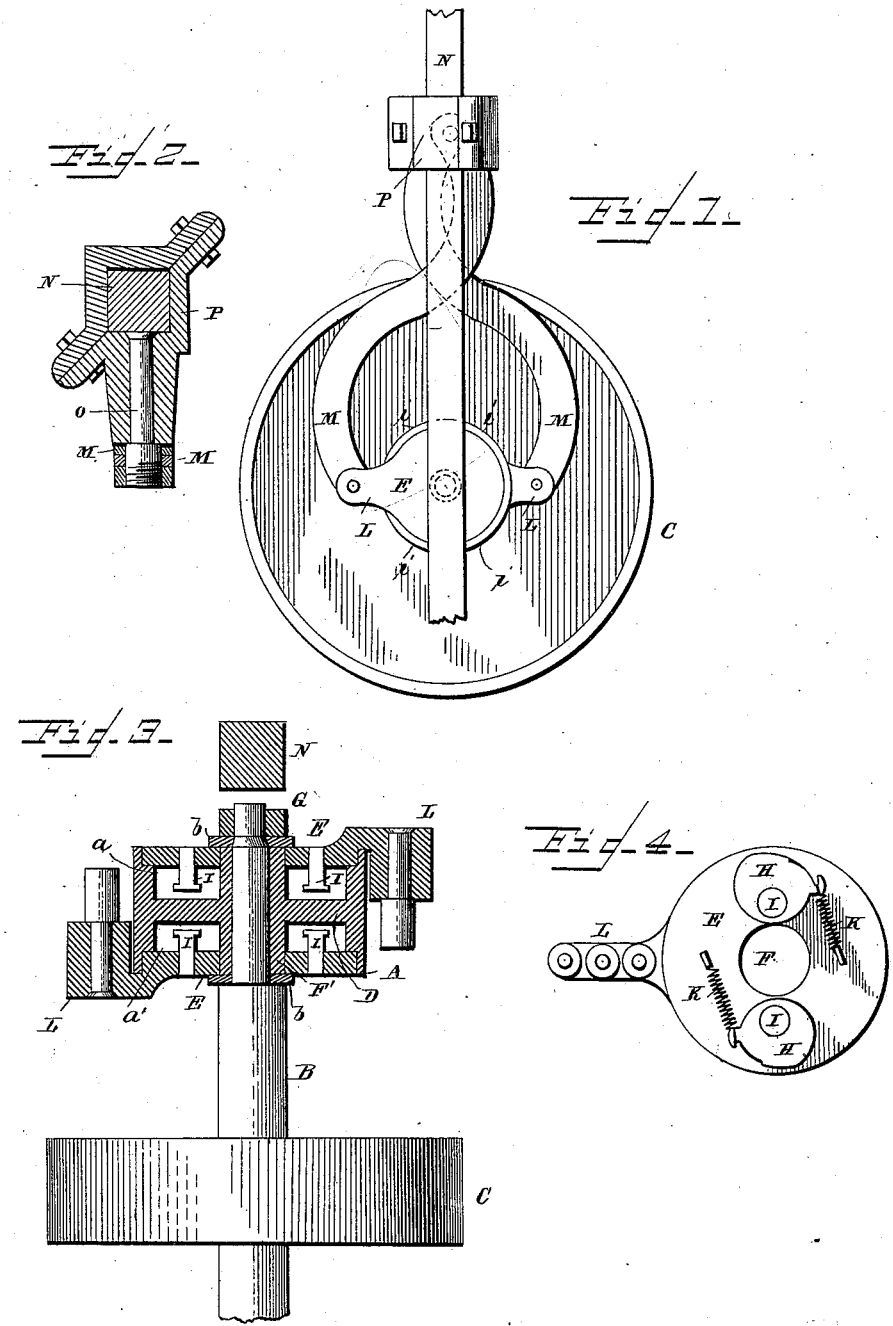

UNITED STATES PATENT OFFICE.

SYLVANDER C. SHEPARD, OF AKRON, OHIO.

DEVICE FOR CONVERTING MOTION.

SPECIFICATION forming part of Letters Patent No. 351,534, dated October 26, 1886.

Application filed April 10, 1886. Serial No. 198,414. (No model.)

*To all whom it may concern:*

Be it known that I, SYLVANDER C. SHEPARD, a citizen of the United States, residing at Akron, in the county of Summit, State of Ohio, have invented certain new and useful Improvements in Devices for Converting Reciprocating into Rotary Motion, of which the following is a specification, reference being had therein to the accompanying drawings.

My invention relates to improvements in devices for converting reciprocating into rotary motion.

The object of my invention is to provide a cheap and reliable device by which motion may be converted from a reciprocating to a rotary direction, as will more fully appear hereinafter.

Referring to the drawings, Figure 1 is a side view of the reciprocating lever with its connections to the clutch mechanism and the rotating shaft. Fig. 2 is a sectional view of the clamp for securing the operating-levers to the reciprocating lever. Fig. 3 is a top or plan view of the rotating shaft and wheel, with the operating parts shown in section with the pawls omitted. Fig. 4 is a side view of one of the drum-head disks having the friction-cams.

A indicates a drum or disk rigidly secured to the shaft B, said shaft being provided with a fly-wheel, C, and mounted in suitable supports. The drum or disk A is provided with a central partition, D, which divides it into two compartments, $a$ and $a'$, the walls of said compartments being utilized as a friction-surface for the operating cams or pawls, as will more fully appear.

E indicates the disks which close the heads of the drum A, said disks being provided with shoulders adapted to fit within the ends of the drum, and central apertures, F, through which the hub F' of the drum A passes. The heads E are held in position on the drum A by means of the screw-nut G, suitable washers, $b$, being used to permit the drum-heads to move without too much friction. Each of the drum heads or disks E is provided with pawls or cams H, said cams being hung eccentrically on the pins I and held in proper position to operate in one direction on the inner surface of the drum A by means of springs K. The drum heads or disks E are each provided with an arm or extension, L, to which the lower ends of the operating-bars M are connected, said arms or extensions L having a series of holes, so that the bars M can be moved toward or from the axis of motion, so as to lengthen or shorten the throw of the drum-heads, and thus increase or diminish the speed of the shaft B, as occasion may require.

N is the reciprocating lever, one end of which is pivoted at any convenient point, said lever being operated by hand or in any suitable manner. The lever N is connected to the upper ends of the operating-bars M by means of the pin O, secured in one portion of the clamp P. The clamp P is designed to impinge on the corners of the lever N, as shown in Fig. 2, the two portions of the clamp being drawn together by means of nuts and bolts, and in this manner the operating-levers M are firmly secured to the reciprocating lever N.

The eccentrics H are so mounted on the drum-heads that one will impinge and operate on the drum A with the downstroke and the other with the upward stroke, the motion of the shaft B being kept uniform by the fly-wheel C, and thus no power is lost.

It will be noticed that the principal operating parts are inclosed in the drum A by the heads F', and that the works are effectually protected from the weather and dirt.

The device herein described may be used in any class of machines in which it is desired to convert reciprocating into rotary motion.

What I claim is—

1. In a device for converting motion, the combination, with the drum A, having recesses $a\ a'$ on opposite sides, of the plates or heads E, secured at said sides, the pawls H, eccentrically pivoted to said plates and arranged to work in the recesses and engage the walls thereof, the bars M, secured to the arms L of said plates, and the reciprocating bar N, the whole arranged to operate substantially as specified.

2. The combination, with the reciprocating bar N, of the clamp secured to said bar, and the bars M, connected to the arms L of the plates E, substantially as and for the purposes specified.

3. The combination, with the drum A, recessed on opposite sides, of the plates E, having pawls H and arms L, the levers M, adjustably secured to said arms, and the adjustable clamp P and reciprocating bar N, the whole arranged to operate substantially as specified.

In testimony whereof I affix my signature in presence of two witnesses.

SYLVANDER C. SHEPARD.

Witnesses:
JOHN C. FRANK,
M. J. SHEPARD.